United States Patent
Hasegawa

(10) Patent No.: US 10,319,404 B1
(45) Date of Patent: Jun. 11, 2019

(54) POSITIONING SHUTTLE CARS IN A TAPE STORAGE SHUTTLE COMPLEX

(71) Applicant: International Business Machines Corporation, Armonk, NY (US)

(72) Inventor: Tohru Hasegawa, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/107,980

(22) Filed: Aug. 21, 2018

(51) Int. Cl.
| | |
|---|---|
| *G11B 15/68* | (2006.01) |
| *G11B 5/55* | (2006.01) |
| *G06F 3/06* | (2006.01) |
| *B65G 1/04* | (2006.01) |

(52) U.S. Cl.
CPC .......... *G11B 15/689* (2013.01); *B65G 1/0492* (2013.01); *G06F 3/067* (2013.01); *G06F 3/0686* (2013.01); *G11B 5/5508* (2013.01); *G11B 15/6895* (2013.01)

(58) Field of Classification Search
CPC ... G11B 15/08; G11B 15/6885; G11B 15/689; G11B 15/446; G11B 15/675; G11B 15/665; G11B 15/6835; B65G 1/026; B65G 1/0485

USPC .............. 360/91, 92.1, 93, 95, 96.51, 98.05; 700/218, 219

See application file for complete search history.

(56) References Cited

U.S. PATENT DOCUMENTS

| | | | |
|---|---|---|---|
| 8,838,872 B2* | 9/2014 | Starr ..................... | G06F 3/0611 711/4 |
| 9,256,370 B2 | 2/2016 | Hasegawa et al. | |
| 9,483,190 B2 | 11/2016 | Hasegawa et al. | |
| 2014/0031973 A1 | 1/2014 | Hirata et al. | |
| 2014/0140803 A1 | 5/2014 | Hasegawa et al. | |
| 2018/0141750 A1 | 5/2018 | Hasegawa et al. | |
| 2018/0144771 A1 | 5/2018 | Hasegawa et al. | |

* cited by examiner

*Primary Examiner* — Nabil Z Hindi
(74) *Attorney, Agent, or Firm* — Kunzler, PC

(57) ABSTRACT

Methods that can position shuttle cars in a tape storage shuttle complex are provided. One method includes tracking, by a processor, tape drive occupancy in a plurality of library strings of a shuttle complex, the tape drive occupancy indicating that each tape drive in the plurality of library strings is one of occupied and vacant and positioning a set of shuttle cars in the shuttle complex based on the tape drive occupancy in the plurality of library strings. Apparatus and computer program products that can include, perform, and/or implement the methods are also provided.

20 Claims, 12 Drawing Sheets

POSITIONING SHUTTLE CARS IN A TAPE STORAGE SHUTTLE COMPLEX

FIELD

The subject matter disclosed herein relates to storage systems and, more particularly, relates to apparatus, methods, and computer program products that can position shuttle cars in a tape storage shuttle complex.

BACKGROUND

Conventional tape storage systems can include multiple library strings arranged in a shuttle complex. A shuttle complex can use a set of shuttle cars to move tape cartridges between library strings of the shuttle complex during data processing operations performed by the library strings. If a shuttle car is not located at the proper position and/or library strings when a tape cartridge needs to be moved to a tape drive in different library string, tape storage systems can experience undue delay and/or latency while performing storage operations.

BRIEF SUMMARY

Methods, apparatus, and computer program products that can position shuttle cars in a tape storage shuttle complex are provided. One method includes tracking, by a processor, tape drive occupancy in a plurality of library strings of a shuttle complex, the tape drive occupancy indicating that each tape drive in the plurality of library strings is one of occupied and vacant and positioning a set of shuttle cars in the shuttle complex based on the tape drive occupancy in the plurality of library strings.

An apparatus includes a tape drive occupancy module that tracks tape drive occupancy in a plurality of library strings of a shuttle complex in which the tape drive occupancy indicating that each tape drive in the plurality of library strings is one of occupied and vacant, and a shuttle car manager module that positions a set of shuttle cars in the shuttle complex based on the tape drive occupancy in the plurality of library strings In various embodiments, at least a portion of the tape drive occupancy module and/or the shuttle car manager module comprises one or more of a set of hardware circuits, a set of programmable hardware devices, and/or executable code stored on a set of non-transitory computer-readable storage mediums.

One computer program product includes a computer-readable storage medium including program instructions embodied therewith. The program instructions are executable by a processor to cause the processor to track tape drive occupancy in a plurality of library strings of a shuttle complex, the tape drive occupancy indicating that each tape drive in the plurality of library strings is one of occupied and vacant and position a set of shuttle cars in the shuttle complex based on the tape drive occupancy in the plurality of library strings.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
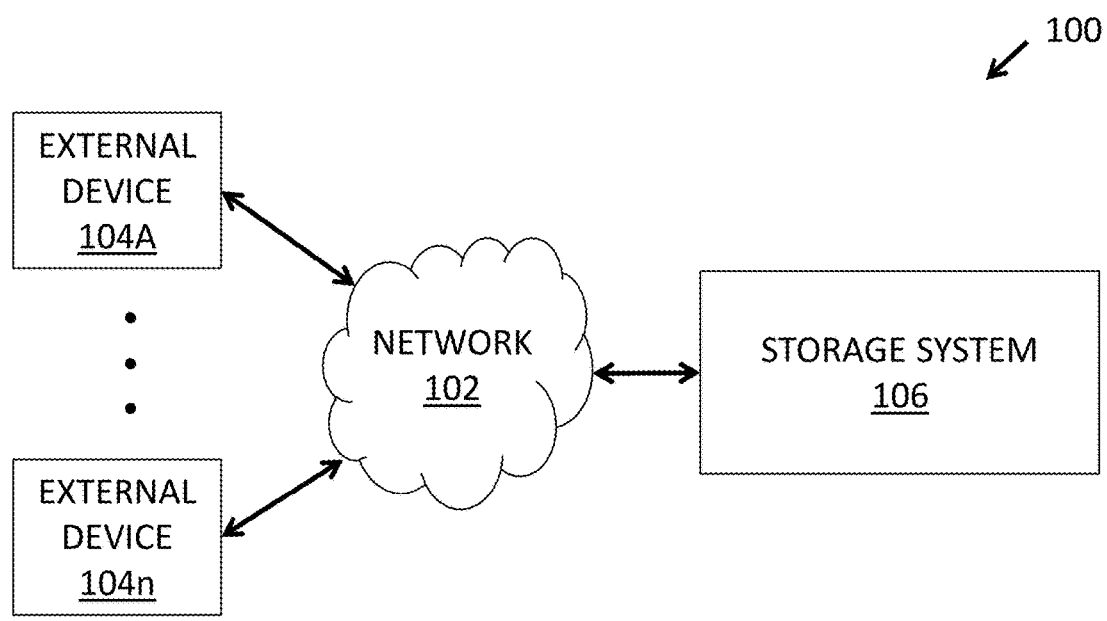
FIG. 1 is a block diagram of one embodiment of a storage network.

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104A through 104n and a storage system 106. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 102. Each client device 104, as part of its respective operation, relies on sending I/O requests to the storage system 106 to write data, read data, and/or modify data. Specifically, each client device 104 can transmit I/O requests to read, write, store, communicate, propagate, and/or transport instructions, data, computer programs, software, code, routines, etc., to the storage system 106 and may comprise at least a portion of a client-server model. In general, the storage system 106 can be accessed by the client device(s) 104 and/or communication with the storage system 106 can be initiated by the client device(s) 104 through a network socket (not shown) utilizing one or more inter-process networking techniques.

Figure 2:
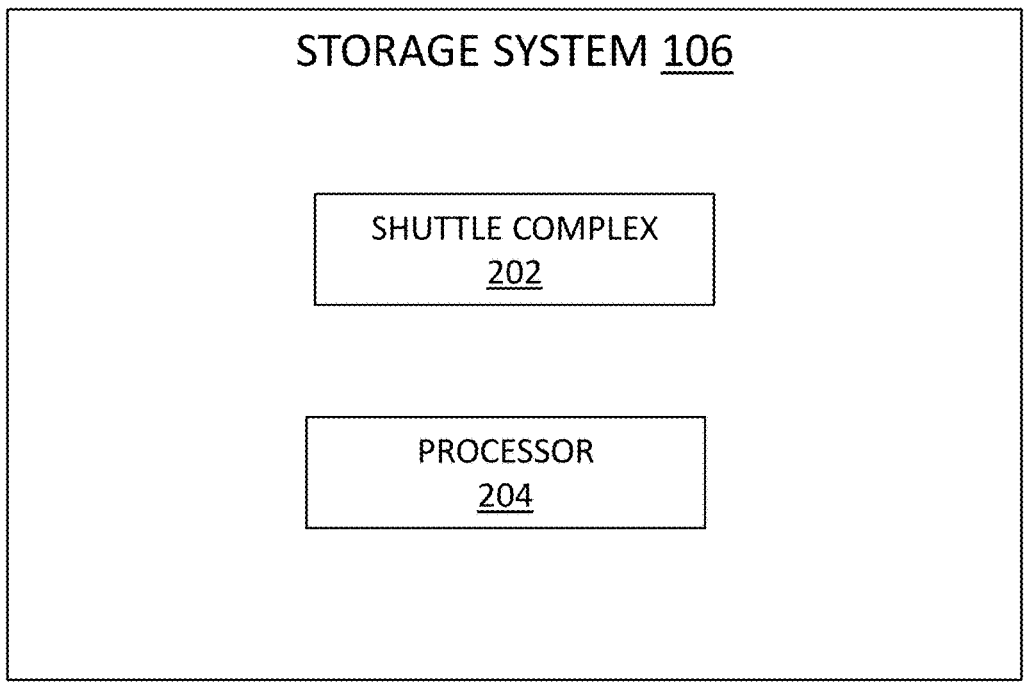
FIG. 2 is a block diagram of one embodiment of a storage system included in the storage network of FIG. 1.

Referring to FIG. 2, FIG. 2 is a block diagram of one embodiment of a storage system 106 illustrated in and discussed with reference to FIG. 1. At least in the illustrated embodiment, the storage system 106 includes, among other components, a storage tape shuttle complex 202 (or simply, a shuttle complex 202) and a processor 204 coupled to and/or in communication with one another.

Figure 3:
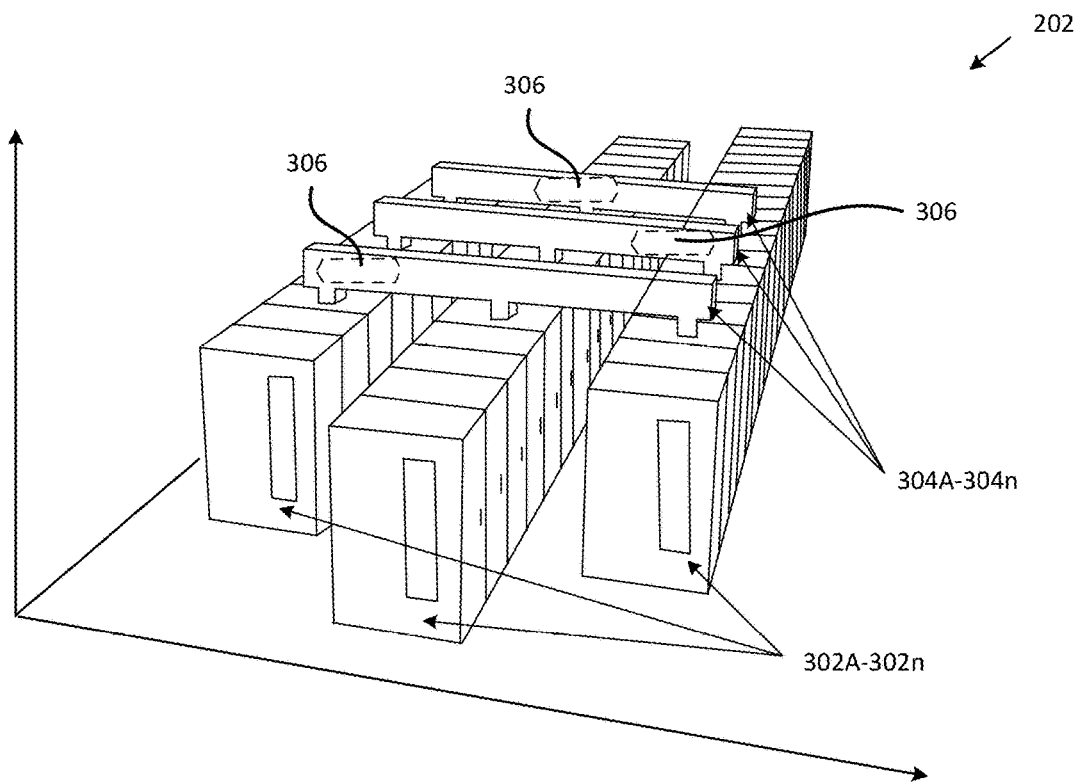
FIG. 3 is a block diagram of one embodiment of a tape storage shuttle complex included in the storage system of FIG. 2.

The shuttle complex 202 may include any suitable type of tape storage device and/or tape storage system that is known or developed in the future that can store computer-useable data. With reference to FIG. 3, FIG. 3 is a diagram of one embodiment of a shuttle complex 202.

At least in the illustrated embodiment, a shuttle complex 202 may include, among other components, a library string 302A, a library string 302B, . . . a library string 302n (also simply referred individually, in various groups, or collectively as library string(s) 302) and a shuttle connection 304A, a shuttle connection 304B, . . . a shuttle connection 304n (also simply referred individually, in various groups, or collectively as shuttle connection(s) 304).

While shuttle complex 202 is illustrated as including three library strings 302, the various embodiments of a shuttle complex 202 are not limited to three library strings 302. That is, various other embodiments of a shuttle complex 202 can include two library strings 302 or a quantity of library strings 302 that is greater than three library strings 302. In other words, a set of library strings 302 in a shuttle complex 202 can include any suitable quantity of library strings 302 greater than or equal to two library strings 302.

Figure 4:
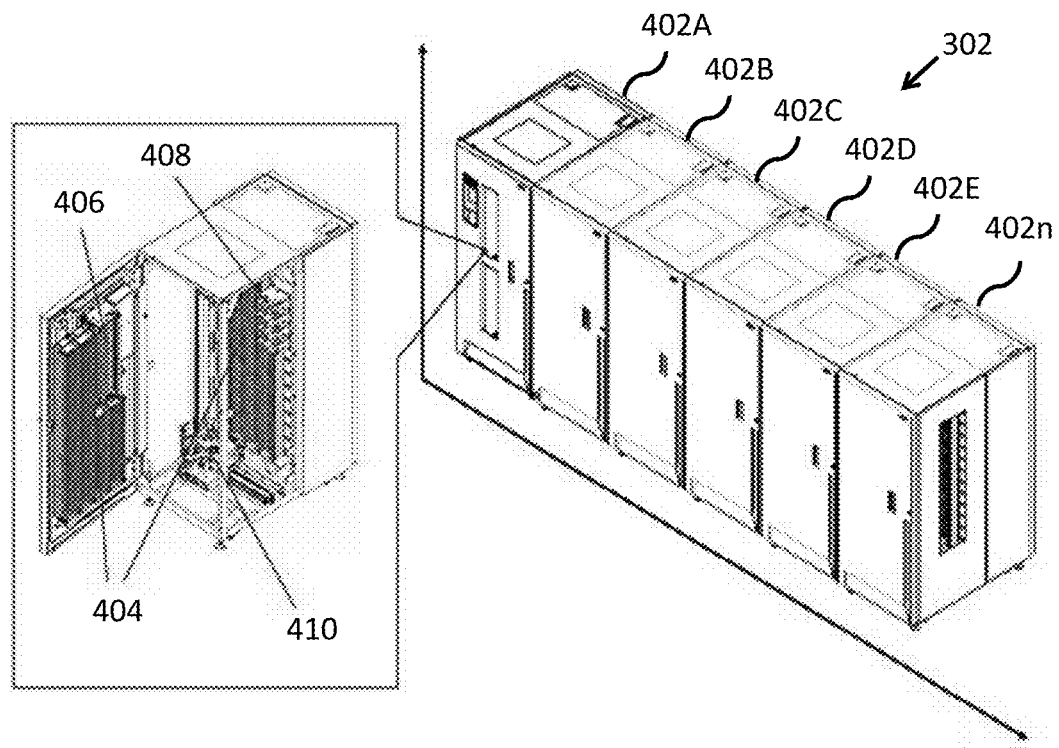
FIG. 4 is a diagram of one embodiment of a library string included in the tape storage shuttle complex of FIG. 3.

Referring to FIG. 4, FIG. 4 is a diagram of one embodiment of a library string 302. At least in the illustrated embodiments, a library string 302 can include, among other components, a library frame 402A, a library frame 402B, a library frame 402C, a library frame 402D, a library frame 402E, . . . a library frame 402n (also simply referred individually, in various groups, or collectively as library frame(s) 402).

While library string 302 is illustrated as including six library frames 402, the various embodiments of a library string 302 are not limited to six library frames 402. That is, various other embodiments of a library string 302 can include one library frame 402, two library frames 402, three library frames 402, four library frames 402, five library frames 402, or a quantity of library frames 402 that is greater than six library frames 402. In other words, a set of library frames 402 in a library string 302 can include any suitable quantity library frames 402 greater than or equal to one library frame 402.

A library frame 402 may include any suitable structure and/or organization that is known or developed in the future that can store and/or process tape data. At least in the illustrated embodiment, a library frame 402 can include, among other components, one or more storage tape cartridges 404, a set of slots 406, a set of tape drives 408, and a mounting arm 410.

A storage tape cartridge 404 may include any suitable device and/or system that can store tape data. That is, a storage tape cartridge 404 may include any type of storage tape cartridge 404 that is known or developed in the future.

A slot 406 may include any suitable device and/or structure that can house one or more storage tape cartridges 404. That is, a slot 406 may include any type of slot 406 that is known or developed in the future. A slot 406 can be considered occupied when a storage tape cartridge 404 is housed therein. Alternatively, a slot 406 can be considered vacant when a storage tape cartridge 404 is not housed therein.

A tape drive 408 may include any suitable device and/or system that can read data from and/or write data to one or more storage tape cartridges 404. That is, a tape drive 408 may include any type of tape drive 408 that is known or developed in the future. A tape drive 408 can be considered occupied when a storage tape cartridge 404 is mounted thereon. Alternatively, a tape drive 408 can be considered vacant when a storage tape cartridge 404 is not mounted thereon.

A mounting arm 410 may include any suitable device and/or system that can mount/unmount one or more storage tape cartridges 404 to/from tape drives 408 and/or slots 406. That is, a mounting arm 410 may include any type of mounting arm 410 that is known or developed in the future.

With reference again to FIG. 3, a shuttle connection 304 may include any suitable device and/or system that transfer data between and/or provide one or more shuttle cars 306 for transferring tape cartridges 404 between library strings 402. That is, a shuttle connection 304 may include any type of shuttle connection 304 that is known or developed in the future.

While shuttle complex 202 is illustrated as including three shuttle connections 304, the various embodiments of a shuttle complex 202 are not limited to three shuttle connections 304. That is, various other embodiments of a shuttle complex 202 can include one shuttle connection 304, two shuttle connections 304, or a quantity of shuttle connections 304 that is greater than three shuttle connections 304. In other words, a set of shuttle connections 304 in a shuttle complex 202 can include any suitable quantity of shuttle connections 304 greater than or equal to one shuttle connection 304.

A shuttle car 306 may include any suitable device and/or system that transfer and/or transport one or more storage tape cartridges 404 between library strings 402. That is, a shuttle car 306 may include any type of shuttle car 306 that is known or developed in the future.

While each shuttle connection 304 is illustrated as including a single shuttle car 306, the various embodiments of a shuttle connection 304 are not limited to one shuttle car 306. That is, various other embodiments of a shuttle connection 304 can include one shuttle car 306 or a quantity of shuttle cars 306 that is greater than one shuttle car 306. In other words, each shuttle connection 304 in a shuttle complex 202 can include any suitable quantity of shuttle cars 306 greater than or equal to one shuttle car 306.

Referring again to FIG. 2, a processor 204 may include any suitable non-volatile/persistent hardware and/or software configured to perform and/or facilitate data storage operations on the storage tape cartridges 404, including, but not limited to, data migration, data archiving, data backup, data rebuilding, data mirroring, replicating data, etc. For instance, a processor 204 may include non-volatile and/or persistent hardware and/or software to perform short-term and/or long-term data storage operations on the storage tape cartridges 404, which may include write operations, read operations, read-write operations, data migration operations, etc., among other operations that are possible and contemplated herein.

In various embodiments, a processor 204 may include hardware and/or software that can receive I/O requests (e.g., write request, read request, and/or read-write request, etc.) from the client device(s) 104 (see FIG. 1) and perform corresponding I/O operations (e.g., write operations, read operations, and/or read-write operations, etc.) on the storage tape cartridges 404 in response thereto. A storage controller 204 may further include hardware and/or software for executing instructions in one or more modules and/or applications to position a set of shuttle cars 306 in a shuttle complex 202.

Figure 5A:
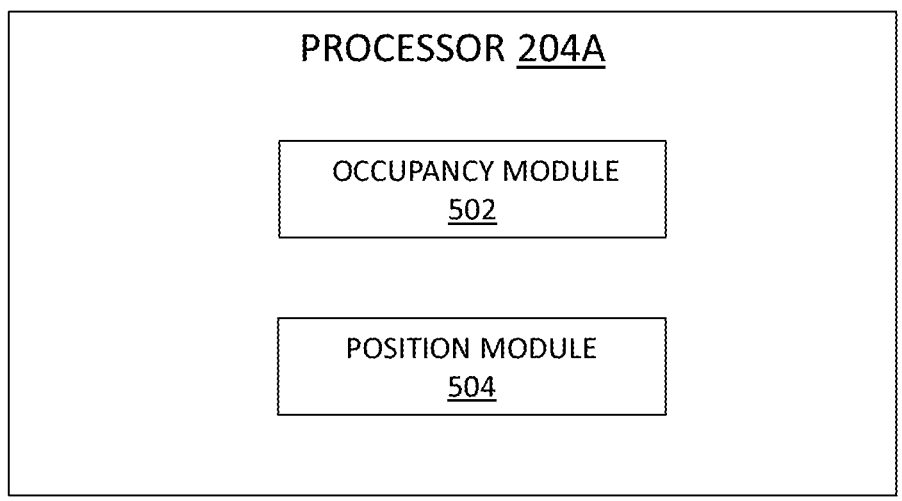
FIGS. 5A and 5B are block diagrams of various embodiments of a processor included in the storage system of FIG. 2.

With reference to FIG. 5A, FIG. 5A is block diagram of one embodiment of a processor 204A that can be included in the storage system 106 illustrated in and discussed with reference to FIG. 2. At least in the illustrated embodiment, the processor 204A includes, among other components, a tape drive occupancy module 502 (or simply, an occupancy module 502) and a shuttle car position module 504 (or simply, a position module 504).

An occupancy module 502 may include any suitable hardware and/or software that can determine and/or track storage tape cartridge occupancy of a tape drive 408 and/or a slot 406 of a library frame 402. In various embodiments, an occupancy module 502 can determine/track whether one or more tape drives 408 in one or more library frames 402 of one or more library strings 302 in a shuttle complex 202 is vacant or occupied by a storage tape cartridge 404. In some embodiments, an occupancy module 502 can determine/track whether each tape drive 408 in one or more library frames 402 of one or more library strings 302 in a shuttle complex 202 is vacant or occupied by a storage tape cartridge 404.

In additional or alternative embodiments, an occupancy module 502 can determine and/or track whether one or more slots 406 in one or more library frames 402 of one or more library strings 302 in a shuttle complex 202 is vacant or occupied by a storage tape cartridge 404. In some embodiments, an occupancy module 502 can determine/track whether each slot 406 in one or more library frames 402 of one or more library strings 302 in a shuttle complex 202 is vacant or occupied by a storage tape cartridge 404.

A position module 504 may include any suitable hardware and/or software that can manage a set of shuttle cars 306 in a shuttle complex 202. In various embodiments, a position module 504 can determine and/or detect a current position of each shuttle car 306. Further, a position module 504 can determine and/or detect whether the current position of a shuttle car 306 is at and/or proximate to the location of a tape drive 408 that is vacant and/or occupied by a storage tape cartridge 404. The determination can be made in response to the position module 504 querying an occupancy module 502 and/or receiving a notification from the occupancy module 502 of the vacant/occupied status of the tape drive 408 where a shuttle car 306 is currently positioned/located.

In various embodiments, a position module 504 can position one or more shuttle cars 306 in a shuttle complex 202 based on the vacant/occupied status of the tape drives 408 in one or more library frames 402 in each library string 302 of a shuttle complex 202. In some embodiments, a position module 504 can position a shuttle car 306 at the location of a set of tape drives 408 in a shuttle frame 402 in which all of the tape drives 408 are occupied by a respective storage tape cartridge 404. In other words, a position module 504 can position a shuttle car 306 at the location of a set of tape drives 408 in a shuttle frame 402 in which there are no vacancies in the set of tape drives 408.

A position module 504, in various embodiments, can relocate one or more shuttle cars 306 in a shuttle complex 202 based on the vacant/occupied status of the tape drives 408 in one or more library frames 402 in each library string 302 of a shuttle complex 202. In some embodiments, a position module 504 can relocate a shuttle car 306 from a position in which one or more tape drives in a shuttle frame 402 include(s) a vacancy (e.g., is/are not housing a storage tape cartridge 404) to the location of a set of tape drives 408 in a shuttle frame 402 in which all of the tape drives 408 are occupied by a respective storage tape cartridge 404. In other words, a position module 504 can relocate a shuttle car 306 to the location of a set of tape drives 408 in a shuttle frame 402 in which there are no vacancies in the set of tape drives 408.

In additional or alternative embodiments, if there are more than one location in which all of the tape drives 408 are occupied by a respective storage tape cartridge 404, a position module 504 can relocate a shuttle car 306 based on the use of the occupied tape drives 408. In some embodiments, a shuttle car 306 can be moved/relocated to the location of a set of occupied tape drives 408 that includes a least recently used (LRU) tape drive 408.

In some embodiments, a shuttle car 306 may be relocated in response to a storage tape cartridge 404 being unmounted from a tape drive 408. For example, in response to a storage tape cartridge 404 being unmounted from a tape drive 408 where a shuttle car 306 is currently located, a position module 504 can relocate/move the shuttle car 306 to the location of a set of tape drives 408 in which there are no vacancies in the set of tape drives 408.

In additional or alternative embodiments, a set of shuttle cars 306 may continue to be located in its/their respective location(s)/position(s) in response to a storage tape cartridge 404 being unmounted from a tape drive 408. For example, in response to a storage tape cartridge 404 being unmounted from a tape drive 408 where a shuttle car 306 is not currently located, a position module 504 can maintain the current position(s)/location(s) of each shuttle car 306 of a set of shuttle cars 306.

The various embodiments of a position module 504 can provide a shuttle car 306 at one or more locations (or each location) where each tape drive 408 is occupied by a storage tape cartridge 404 (e.g., where there are no vacant tape drives 408). Providing a shuttle car 306 at one or more locations (or each location) where each tape drive 408 is occupied by a storage tape cartridge 404 can allow a shuttle complex 202 to process data more efficiently (e.g., reduce data processing time) because a shuttle car 306 can move a storage tape cartridge 404 that would otherwise have to wait until a tape drive 408 at a library frame 402 housing the storage tape cartridge 404 to become vacant (e.g., available) to another library string 302 that includes a library frame 402 with a vacant (e.g., available) tape drive 408 to process an I/O request directed to the storage tape cartridge 404.

Figure 5B:
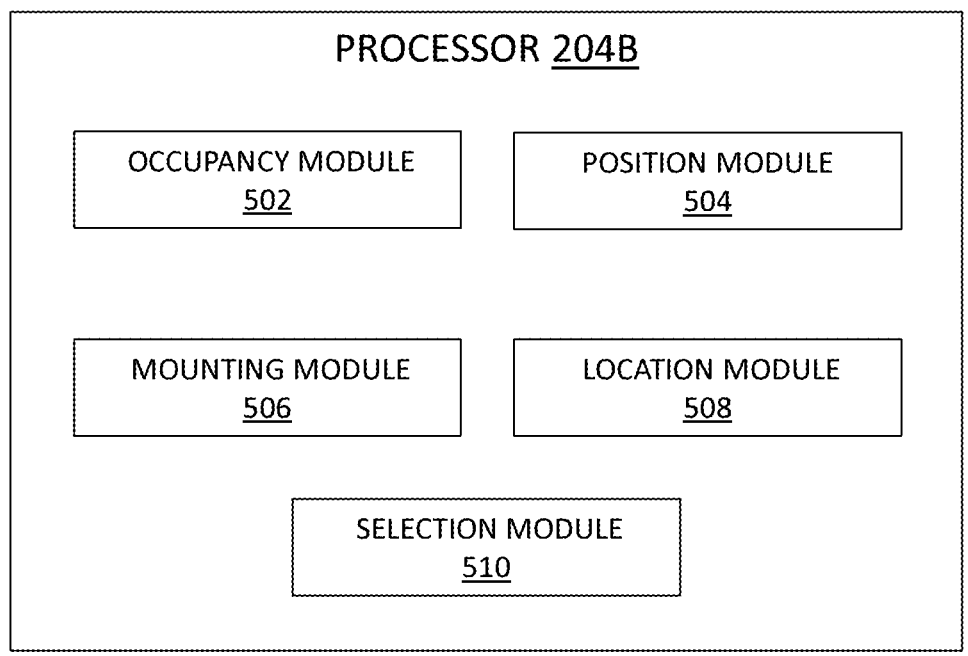

Referring to FIG. 5B, FIG. 5B is block diagram of another embodiment of a processor 204B that can be included in the storage system 106 illustrated in and discussed with reference to FIG. 2. A processor 204B, in various embodiments, can include an occupancy module 502 and a position module 504 similar to a processor 204A illustrated in and discussed with reference to FIG. 5A. At least in the illustrated embodiment, a processor 204B can further include, among other components, a mounting module 506, a location module 508, and a selection module 510.

A mounting module 506 may include any hardware and/or software that can manage mounting and/or unmounting storage tape cartridges 404. In various embodiments, a mounting module 506 can manage one or more mounting/unmounting operations of a mounting arm 410.

In some or alternative embodiments, a mounting module 506 can manage a mounting arm 410 to mount and/or unmount storage tape cartridges 404 to and/or from slots 406. For example, a mounting module 506 can control one or more mounting arms 410 to mount tape storage cartridges 404 to and unmount tape storage cartridges 404 from one or more slots 406 in a shuttle complex 202.

A mounting module 506, in additional or alternative embodiments, can unmount a storage tape cartridge 404 in accordance with a use policy. A use policy can include any policy that specifies a predetermined quantity of unused tape drives 408 for a location (e.g., a library frame 402). In various embodiments, a use policy can specify that a minimum quantity of tape drives 408 should remain unused at any given time. For example, a use policy can specify that at least one tape drive 408, at least two tape drives 408, or at least three tape drives 408, etc. should remain unused at any given time.

In various embodiments, a mounting module 506 can unmount one or more storage tape cartridges 404 from one or more tape drives 408 in response to determining that the conditions of a use policy are not being satisfied. For example, is a use policy specifies that at least one tape drive 408 should be unused at any given time and all of the tape drives 408 at a location are being used, a mounting module 506 can unmount a storage tape cartridge 404 from one of the tape drives 408. In various embodiments, a selection module 510 (see below) can select a least recently used tape drive 408 as the tape drive 408 from which to unmount a storage tape cartridge 404.

In further additional or alternative embodiments, a mounting module 506 can manage mounting arms 410 to mount and/or unmount storage tape cartridges 404 to and/or from tape drives 408 in a shuttle complex 202. For example, a mounting module 506 can control one or more mounting arms 410 to mount tape storage cartridges 404 to and/or unmount tape storage cartridges 404 from one or more tape drives 408 in library frames 402 of library strings 302 of a shuttle complex 202.

A location module 508 may include any hardware and/or software that can determine and/or detect the location of a storage tape cartridge 404 that has been mounted to and/or unmounted from a tape drive 408. In some embodiments, a location module 508 can notify (e.g., transmit a notification to) an occupancy module 502 each time that a storage tape cartridge 404 is mounted and/or unmounted from a tape drive 408. In additional or alternative embodiments, a location module 508 can notify (e.g., transmit a notification to) a position module 504 each time that a storage tape cartridge 404 is mounted and/or unmounted from a tape drive 408.

In various embodiments, the notification to the occupancy module 502 and/or to the position module 504 may include the location of the tape drive 408 from which the storage tape cartridge 404 has been mounted (e.g., the location of the tape drive 408 that became recently occupied (e.g., the occupied tape drive 408)) and/or unmounted (e.g., the location of the tape drive 408 that became recently vacant (e.g., the vacant tape drive 408)). Further, the location may reference the library frame 402, the library string 302, and/or tape drive 408 from which a storage tape cartridge 404 has been mounted and/or unmounted.

A selection module 510 may include any suitable hardware and/or software that can select tape drives 408 for mounting and unmounting storage tape cartridges 404. In various embodiments, a selection module 510 can make the various tape drive selections based on the occupancy of the tape drives 408 in a shuttle complex 202.

In some embodiments, a selection module 510 can select a tape drive 408 for mounting a storage tape cartridge 404 in response to a data file (or simply, a file) being accessed via an input/output (I/O) request (e.g., being accessed to have one or more I/O operations (e.g., read operations, write operations, etc.) performed thereon). A mounting selection process can include determining whether a storage tape cartridge 404 that is the target of the I/O request (e.g., a target storage tape cartridge 404) is presently mounted on a tape drive 408.

The selection module 510 selects the tape drive 408 upon which the target storage tape drive 404 is mounted in response to determining that the target storage tape cartridge 404 is presently mounted on a tape drive 408. The selection module 510 determines whether there is tape drive 408 that is not being used (e.g., an unused tape drive 408) in response to determining that the target storage tape cartridge 404 is not presently mounted on a tape drive 408.

Further, the selection module 510 selects an unused tape drive 408 in response to determining that there is a tape drive 408 that is not being used. The selection module 510 determines whether there is tape drive 408 that is vacant (e.g., a vacant tape drive 408) in response to determining that there is not an unused tape drive 408.

In addition, the selection module 510 selects a vacant tape drive 408 in response to determining that there is a tape drive 408 that is not occupied by a storage tape cartridge 404. The selection module 510 determines whether there is tape drive 408 without an open file and/or directory in response to determining that there is not a vacant tape drive 408.

The selection module 510 selects an LRU tape drive 408 in a set of occupied tape drives 408 without an open file and/or directory in response to determining that there is one or more occupied tape drives 408 without an open file and/or directory. The selection module 510 selects an LRU tape drive 408 in a set of occupied tape drives 408 with an open file and/or directory in response to determining that there is one or more occupied tape drives 408 with an open file and/or directory.

In additional or alternative embodiments, a selection module 510 can select a tape drive 408 for unmounting a storage tape cartridge 404 in response to one or more I/O operations being performed on a storage tape cartridge 404. An unmounting selection process can include determining whether there are occupied tape drives without an open file and/or directory.

The selection module 510 selects an LRU tape drive 408 in a set of occupied tape drives 408 without an open file and/or directory for unmounting in response to determining that there is one or more occupied tape drives 408 without an open file and/or directory. The selection module 510 selects an LRU tape drive 408 in a set of occupied tape drives 408 with an open file and/or directory for unmounting in response to determining that there is/are one or more occupied tape drives 408 with an open file and/or directory.

Figure 6:
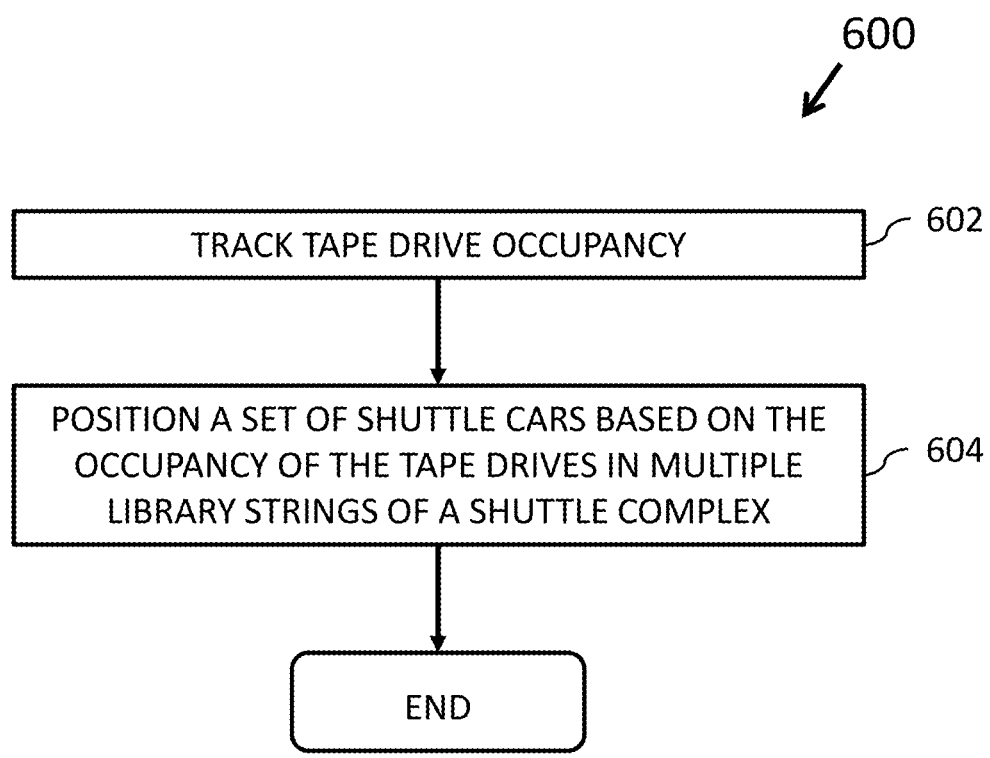
FIG. 6 is a schematic flow chart diagram illustrating one embodiment of a method for positioning shuttle cars in a tape storage shuttle complex.

With reference to FIG. 6, FIG. 6 is a schematic flow chart diagram illustrating one embodiment of a method 600 for positioning shuttle cars 306 in a shuttle complex 202. At least in the illustrated embodiment, method 600 can begin by a processor 204 (e.g., via an occupancy module 502) tracking tape drive occupancy for a plurality of tape drives 408 in a shuttle complex 202 (block 602).

The processor 204 can position a set of shuttle cars 306 in the shuttle complex 202 based on the tape drive occupancy for the plurality of tape drives 408 (block 604). Method 600 can then end.

Figure 7:
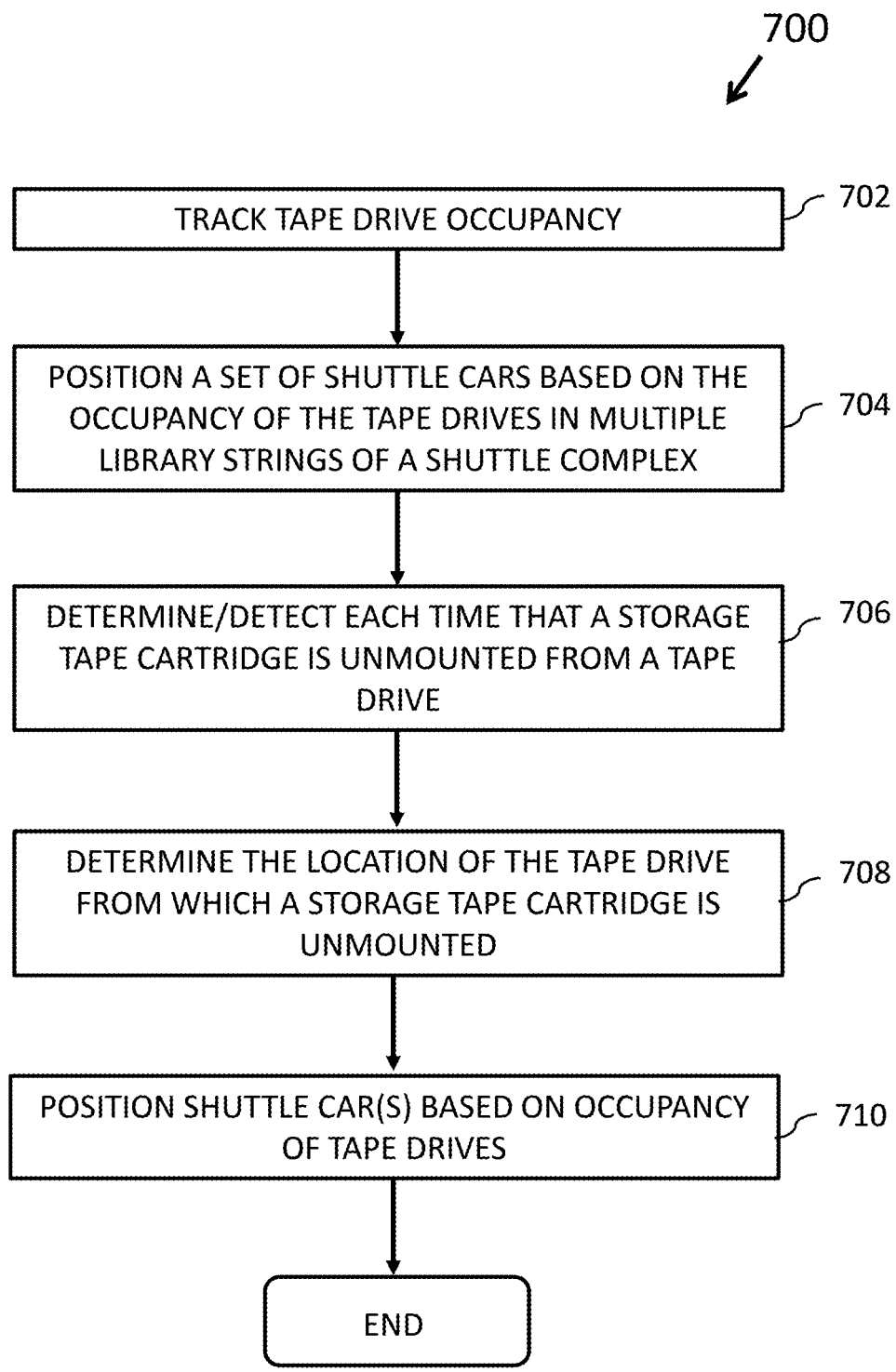
FIG. 7 is a schematic flow chart diagram illustrating another embodiment of a method for positioning shuttle cars in a tape storage shuttle complex.

Referring to FIG. 7, FIG. 7 is a schematic flow chart diagram illustrating another embodiment of a method 700 for positioning shuttle cars 306 in a shuttle complex 202. At least in the illustrated embodiment, method 700 can begin by a processor 204 (e.g., via an occupancy module 502) tracking tape drive occupancy for a plurality of tape drives 408 in a shuttle complex 202 (block 702).

The processor 204 can position a set of shuttle cars 306 in the shuttle complex 202 based on the tape drive occupancy for the plurality of tape drives 408 (block 704). In various embodiments, the processor 204 can determine and/or detect each time that a storage tape cartridge 404 is unmounted from a tape drive 408 (block 706).

Further, the processor 204 can determine the location of the vacant tape drive in response to determining/detecting that the storage tape cartridge has been unmounted (block 708). A position module 504 of the processor 204 can position a set of shuttle cars 306 based on the occupancy of the plurality of tape drives 408 in the shuttle complex 202 (block 710), as discussed elsewhere herein. Method 700 can then end.

Figure 8:
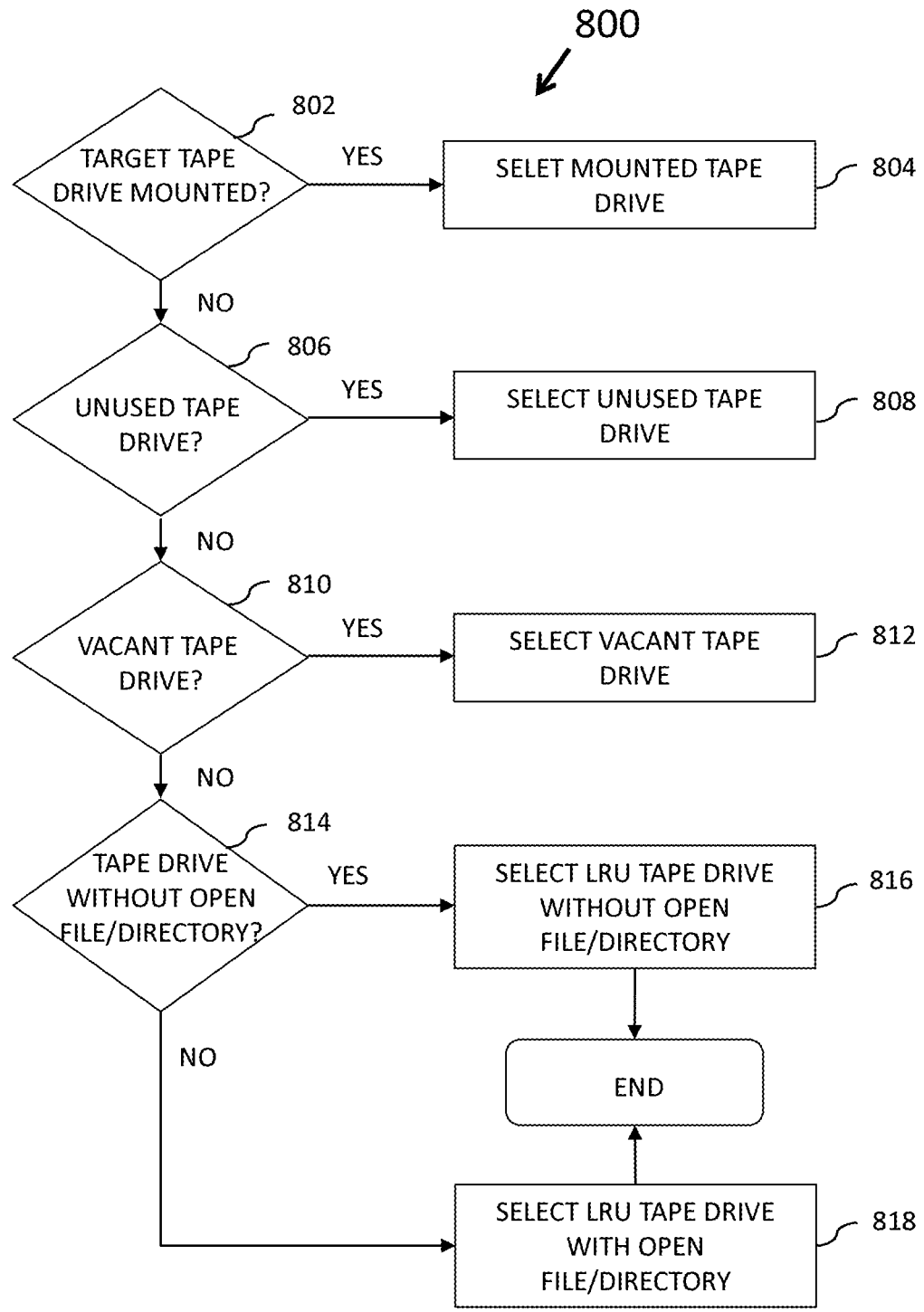
FIG. 8 is a schematic flow chart diagram illustrating one embodiment of a method for selecting a tape drive to mount a storage tape cartridge.

With reference to FIG. 8, FIG. 8 is a schematic flow chart diagram illustrating one embodiment of a method 800 for selecting a tape drive 408 to mount a storage tape cartridge 404 thereon. At least in the illustrated embodiment, method 800 can begin by a processor 204 (e.g., via an occupancy module 502) determining whether a target storage tape cartridge 404 is presently mounted on a tape drive 408 (block 802).

The processor 204 (e.g., via a selection module 510) can select the tape drive 408 upon which the target storage tape drive 404 is mounted in response to determining that the target storage tape cartridge 404 is presently mounted on a tape drive 408 (e.g., a "YES" in block 802) (block 804). The processor 204 can determine whether there is an unused tape drive 408 in response to determining that the target storage tape cartridge 404 is not presently mounted on a tape drive 408 (e.g., a "NO" in block 802) (block 806).

Further, the processor 204 can select an unused tape drive 408 in response to determining that there is a tape drive 408 that is not being used (e.g., a "YES" in block 806) (block 808). The processor 204 can determine whether there is a vacant tape drive 408 in response to determining that there is not an unused tape drive 408 (e.g., a "NO" in block 806) (block 810).

In addition, the processor 206 can select a vacant tape drive 408 in response to determining that there is a tape drive 408 that is not occupied by a storage tape cartridge 404 (e.g., a "YES" in block 810) (block 812). The processor 206 can determine whether there is tape drive 408 without an open file and/or directory in response to determining that there is not a vacant tape drive 408 (e.g., a "NO" in block 810) (block 814).

The processor 206 can select an LRU tape drive 408 in a set of occupied tape drives 408 without an open file and/or directory in response to determining that there is/are one or more occupied tape drives 408 without an open file and/or directory (e.g., a "YES" in block 814) (block 816). The selection module 510 selects an LRU tape drive 408 in a set of occupied tape drives 408 with an open file and/or directory in response to determining that there is/are one or more occupied tape drives 408 with an open file and/or directory (e.g., a "NO" in block 814) (block 818). Method 800 may then end.

Figure 9:
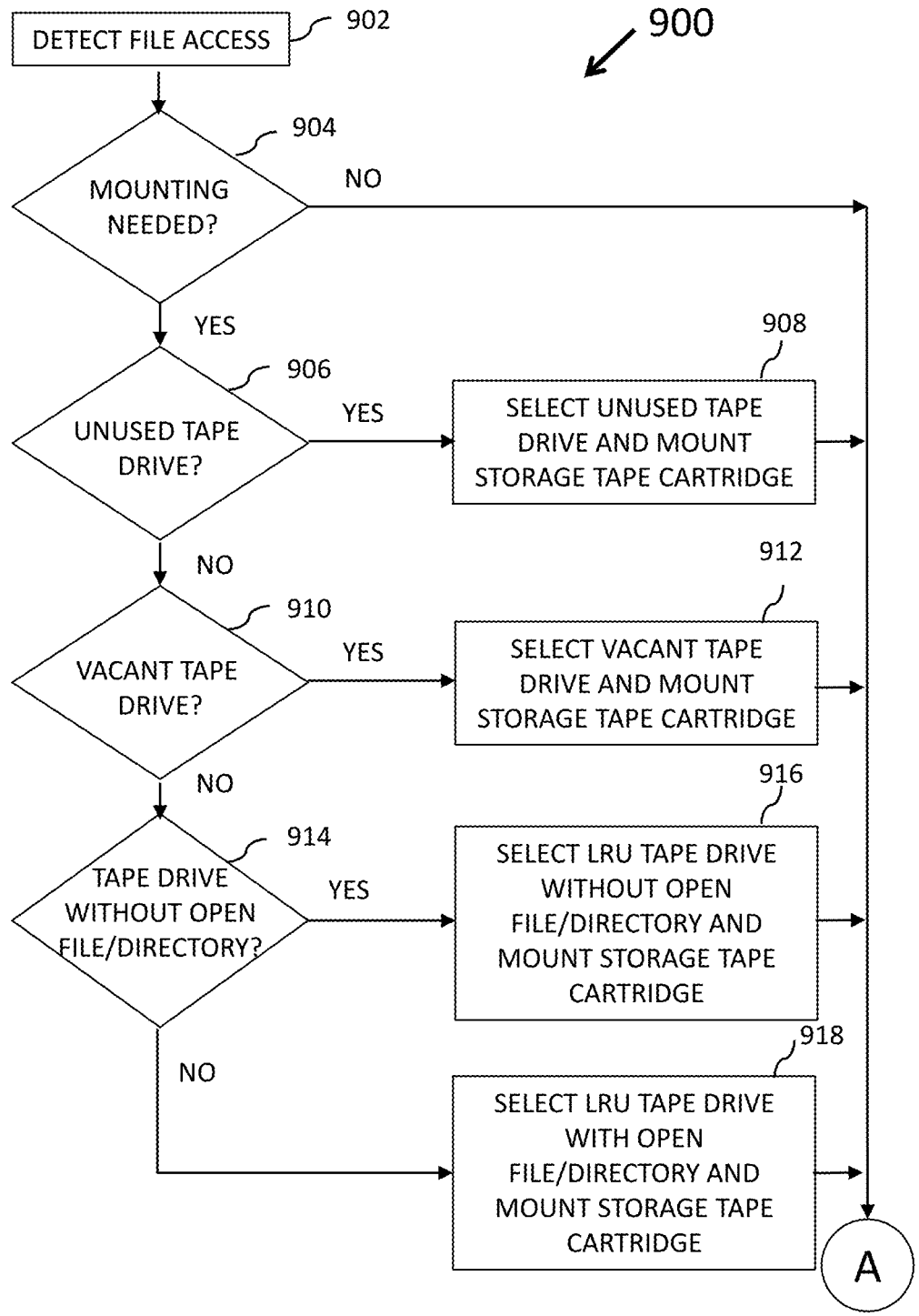
FIG. 9 is a schematic flow chart diagram illustrating yet another embodiment of a method for positioning shuttle cars in a tape storage shuttle complex.
Figure 9:
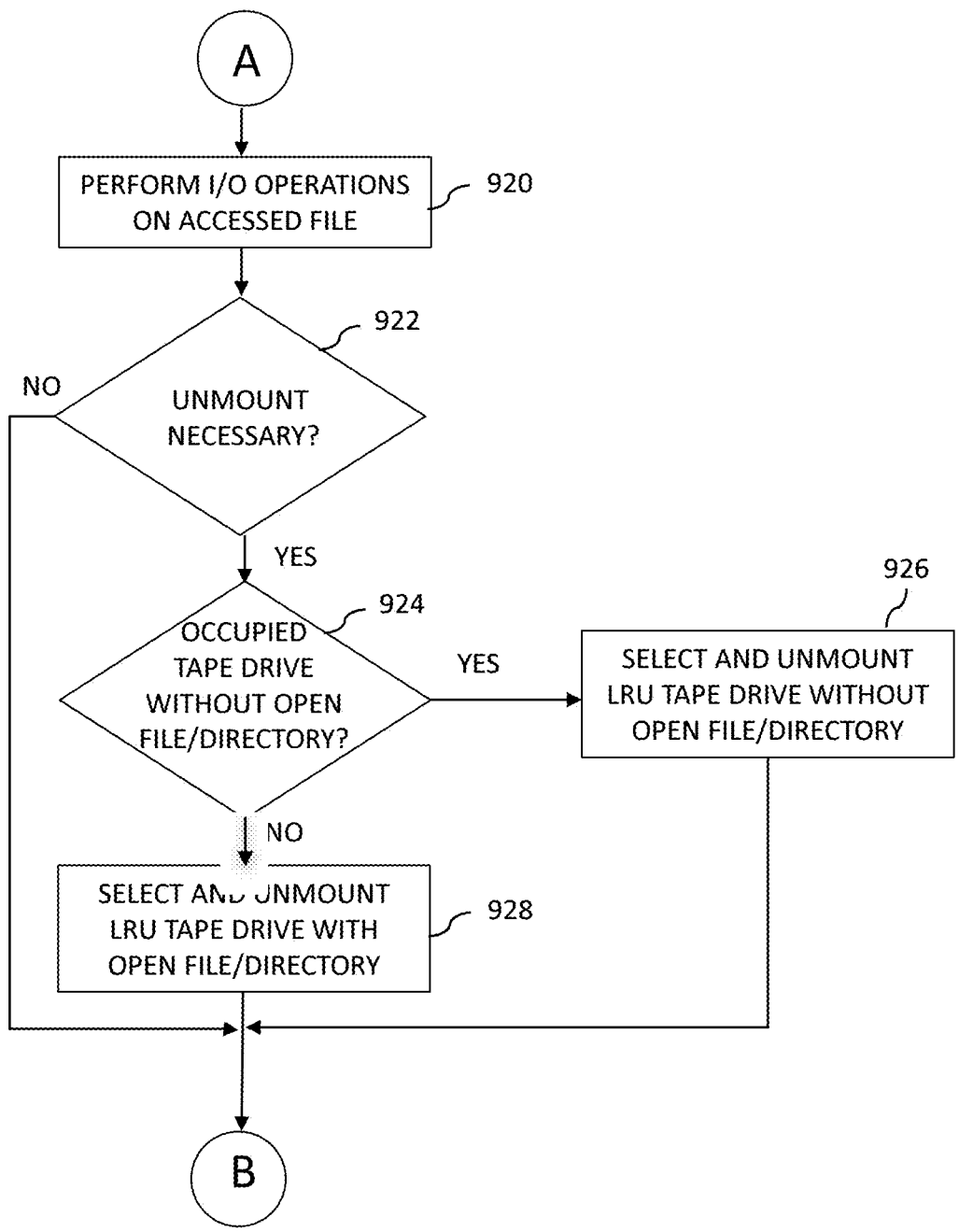
Figure 9:
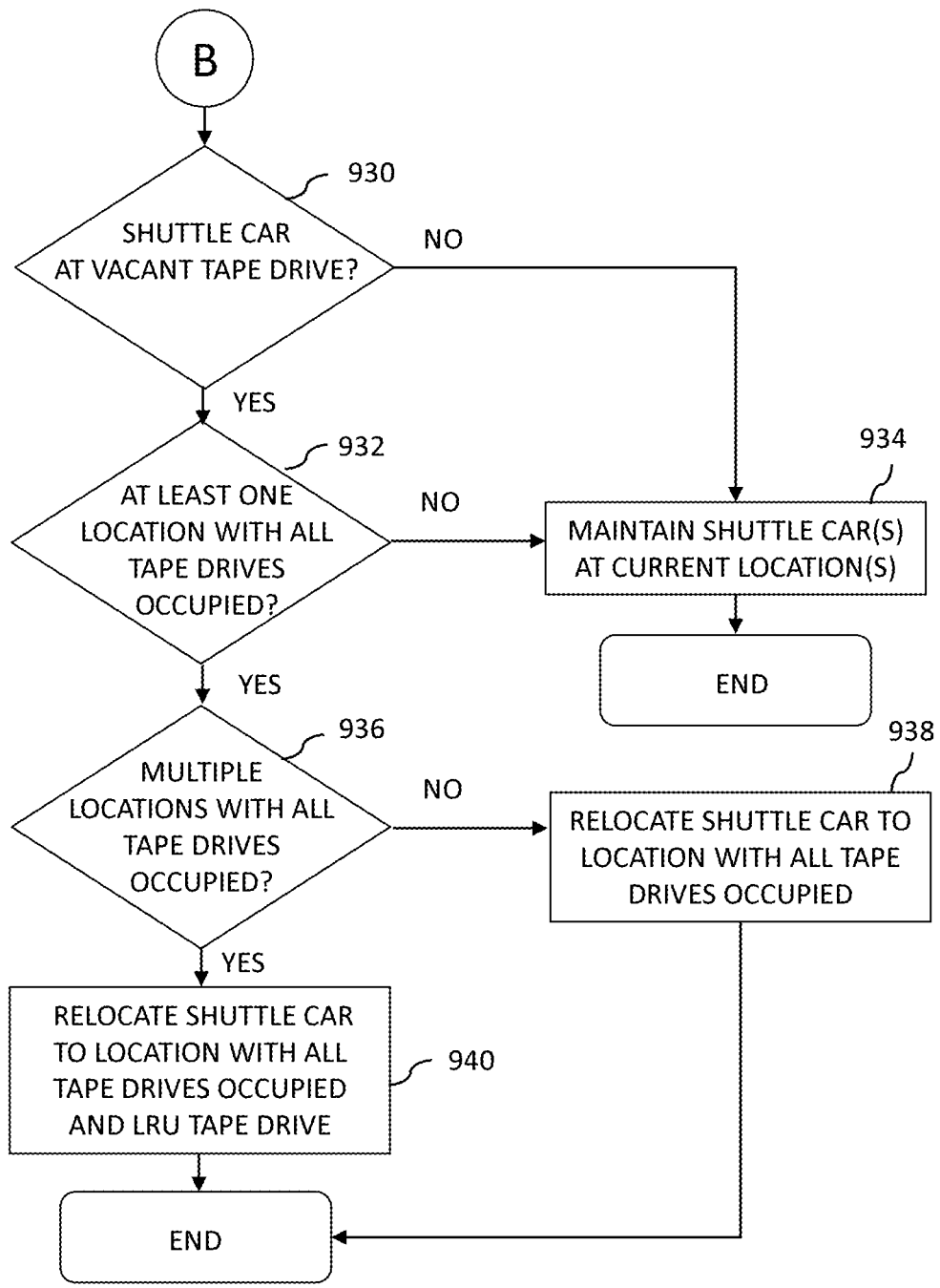

Referring to FIG. 9, FIG. 9 is a schematic flow chart diagram illustrating yet another embodiment of a method 900 for positioning shuttle cars 306 in a shuttle complex 202. At least in the illustrated embodiment, method 900 can begin by a processor 204 detecting that a data file in a shuttle complex 202 has been accessed (block 902).

The processor 204 can determine whether a storage tape cartridge 404 needs to be mounted to a tape drive 408 in response to determining that the file has been accessed (block 904). In response to determining that a storage tape cartridge 404 does not need to be mounted to a tape drive 408 (e.g., a "NO" in block 904), the processor 204 can perform one or more I/O operations on the accessed file (block 920).

In response to determining that a storage tape cartridge 404 needs to be mounted to a tape drive 408 (e.g., a "YES" in block 904), the processor 204 (e.g., via an occupancy module 502) can determine whether there is an unused tape drive 408 (block 906).

In response to determining that there is an unused tape drive 408 (e.g., a "YES" in block 906), the processor 204 can select the unused tape drive 408 and mount a storage tape cartridge thereon (block 908) and then perform one or more I/O operations on the accessed file (block 920). In response to determining that there is not an unused tape drive 408 (e.g., a "NO" in block 906). The processor 204 can determine whether there is a vacant tape drive 408 (block 910).

In response to determining that there is a tape drive 408 that is not occupied by a storage tape cartridge 404 (e.g., a "YES" in block 910), the processor 206 can select a vacant tape drive 408 and mount a storage tape cartridge thereon (block 912) and then perform one or more I/O operations on the accessed file (block 920). In response to determining that there is not a vacant tape drive 408 (e.g., a "NO" in block 910), the processor 206 can determine whether there is tape drive 408 without an open file and/or directory (block 914).

In response to determining that there is one or more occupied tape drives 408 without an open file and/or directory (e.g., a "YES" in block 914), the processor 206 can select an LRU tape drive 408 in a set of occupied tape drives 408 without an open file and/or directory and mount a storage tape cartridge thereon (block 916) and then perform one or more I/O operations on the accessed file (block 920). In response to determining that there is one or more occupied tape drives 408 with an open file and/or directory (e.g., a "NO" in block 914) the selection module 510 can select an LRU tape drive 408 in a set of occupied tape drives 408 with an open file and/or directory and mount a storage tape cartridge thereon (block 918) and then perform one or more I/O operations on the accessed file (block 920).

Upon completing the one or more I/O operations in block 920, the processor 206 can whether an unmount is necessary in accordance with a use policy (block 922), as discussed elsewhere herein. In response to determining that an unmount is not necessary (e.g., a "NO" in block 922), the processor 204 can determine whether there is a shuttle car 306 at the vacant tape drive 408 (block 930). In response to determining that an unmount is necessary (e.g., a "YES" in block 922), the processor 204 can determine whether there is one or more occupied tape drives 408 without an open file and/or directory (block 924).

In response to determining that there is one or more occupied tape drives 408 without an open file and/or directory (e.g., a "YES" in block 924), the processor 204 can select and mount an LRU tape drive 408 in a set of occupied tape drives 408 without an open file and/or directory for unmounting (block 926). The processor 204 can then determine whether there is a shuttle car 306 at the location of the vacant tape drive 408 (block 930).

In response to determining that there is one or more occupied tape drives 408 with an open file and/or directory (e.g., a "NO" in block 924), the processor 206 can select and mount an LRU tape drive 408 in a set of occupied tape drives 408 with an open file and/or directory for unmounting (block 928). The processor 204 can then determine whether there is a shuttle car 306 at the location of the vacant tape drive 408 (block 930).

In response to determining that a shuttle car 306 is not present at the location of the vacant tape drive 408 (e.g., a "NO" in block 930), the processor 204 can maintain each shuttle car 306 in the shuttle complex 202 at its current location (block 934). Method 900 can then end.

In response to determining that a shuttle car 306 is present at the location of the vacant tape drive 408 (e.g., a "YES" in block 930), the processor 204 can determine whether there is at least one location (e.g., library frame 402) in the shuttle complex 202 in which all of the tape drives 408 are occupied (block 932). In response to determining that there are no locations in the shuttle complex 202 in which all of the tape drives 408 are occupied (e.g., a "NO" in block 932), the processor 204 can maintain each shuttle car 306 in the shuttle complex 202 at its current location (block 930). Method 900 can then end.

In response to determining that there is at least one location in the shuttle complex 202 in which all of the tape drives 408 are occupied (e.g., a "YES" in block 932), the processor 204 can determine whether there are multiple locations (e.g., library frames 402) in the shuttle complex 202 in which all of the tape drives 408 are occupied (block 936).

In response to determining that there is one location in the shuttle complex 202 in which all of the tape drives 408 are occupied (e.g., a "NO" in block 936), the processor 204 can relocate and/or move the shuttle car 306 to the single location (e.g., a new and/or different location) where all of the tape drives 408 are occupied (block 938). Method 900 can then end.

In response to determining that there are multiple locations in the shuttle complex 202 in which all of the tape drives 408 are occupied (e.g., a "YES" in block 936), the processor 204 can relocate and/or move the shuttle car 306 to a new and/or different location where all of the tape drives 408 are occupied and includes an LRU tape drive 408 (block 940). Method 900 can then end.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a tape drive occupancy module that tracks tape drive occupancy in a plurality of library strings of a shuttle complex, the tape drive occupancy indicating whether each tape drive in the plurality of library strings is one of occupied and vacant; and
a shuttle car position module that positions a set of shuttle cars in the shuttle complex based on the tape drive occupancy in the plurality of library strings,
wherein at least a portion of said modules comprise one or more of a set of hardware circuits, a set of programmable hardware devices, and executable code stored on a set of non-transitory computer-readable storage mediums.

2. The apparatus of claim 1, further comprising:
a mounting manager module that determines when a tape cartridge is unmounted from a tape drive, wherein the tape drive is a vacant tape drive upon the tape cartridge being unmounted; and
a location module that determines a location of the vacant tape drive.

3. The apparatus of claim 2, wherein:
the shuttle car manager module is configured to determine whether a shuttle car is present at the location of the vacant tape drive in response to determining the location of the vacant tape drive.

4. The apparatus of claim 3, wherein:
the shuttle car manager module is configured to relocate the shuttle car to a different location in the plurality of library strings in response to determining that the shuttle car is present at the location of the vacant tape drive.

5. The apparatus of claim 4, wherein:
the shuttle car manager is configured to select the different position based on each tape drive at the different location being occupied by a respective tape cartridge.

6. The apparatus of claim 5, wherein:
the plurality of library strings includes a plurality of locations in which each tape drive is occupied; and
the shuttle car manager is configured to select the different position based further on a second tape drive at the different location including a least recently used (LRU) occupied tape drive.

7. The apparatus of claim 4, wherein:
the shuttle car manager module is configured to maintain a respective current location in the plurality of library strings for each shuttle car in the set of shuttle cars in response to determining that the shuttle car is not present at the location of the vacant tape drive.

8. A method, comprising:
tracking, by a processor, tape drive occupancy in a plurality of library strings of a shuttle complex, the tape drive occupancy indicating whether each tape drive in the plurality of library strings is one of occupied and vacant; and
positioning a set of shuttle cars in the shuttle complex based on the tape drive occupancy in the plurality of library strings.

9. The method of claim 8, further comprising:
determining that a tape cartridge is unmounted from a tape drive, wherein the tape drive is a vacant tape drive upon the tape cartridge being unmounted; and
determining a location of the vacant tape drive.

10. The method of claim 9, further comprises:
determining whether a shuttle car is present at the location of the vacant tape drive in response to determining the location of the vacant tape drive.

11. The method of claim 10, further comprising:
relocating the shuttle car to a different location in the plurality of library strings in response to determining that the shuttle car is present at the location of the vacant tape drive.

12. The method of claim 11, wherein selecting the different position comprises:
selecting the different position based on each tape drive at the different location being occupied by a respective tape cartridge.

13. The method of claim 12, wherein:
the plurality of library strings includes a plurality of locations in which each tape drive is occupied; and
selecting the different position comprises selecting the different position based further on a second tape drive at the different location including a least recently used (LRU) occupied tape drive.

14. The method of claim 11, further comprising:
maintaining a respective current location in the plurality of library strings for each shuttle car in the set of shuttle cars in response to determining that the shuttle car is not present at the location of the vacant tape drive.

15. A computer program product comprising a computer-readable storage medium including program instructions embodied therewith, the program instructions executable by a processor to cause the processor to:
track tape drive occupancy in a plurality of library strings of a shuttle complex, the tape drive occupancy indicating whether each tape drive in the plurality of library strings is one of occupied and vacant; and
position a set of shuttle cars in the shuttle complex based on the tape drive occupancy in the plurality of library strings.

16. The computer program product of claim 15, wherein:
the program instructions further cause the processor to determine that a tape cartridge is unmounted from a tape drive;
the tape drive is a vacant tape drive upon the tape cartridge being unmounted; and
the program instructions further cause the processor to determine a location of the vacant tape drive.

17. The computer program product of claim 16, wherein the program instructions further cause the processor to:
determine whether a shuttle car is present at the location of the vacant tape drive in response to determining the location of the vacant tape drive.

18. The computer program product of claim 17, wherein the program instructions further cause the processor to:
relocate the shuttle car to a different location in the plurality of library strings in response to determining that the shuttle car is present at the location of the vacant tape drive; and
maintain a respective current location in the plurality of library strings for each shuttle car in the set of shuttle cars in response to determining that the shuttle car is not present at the location of the vacant tape drive.

19. The computer program product of claim 18, wherein the program instructions further cause the processor to:
select the different position based on each tape drive at the different location being occupied by a respective tape cartridge.

20. The computer program product of claim 17, wherein:
the plurality of library strings includes a plurality of locations in which each tape drive is occupied; and selecting the different position comprises selecting the different position based further on a second tape drive at the different location including a least recently used (LRU) occupied tape drive.

\* \* \* \* \*